United States Patent [19]

Putt

[11] 4,353,209
[45] Oct. 12, 1982

[54] HYDRAULIC BRAKE BOOSTER

[75] Inventor: James B. Putt, Granger, Ind.

[73] Assignee: The Bendix Corporation, Southfield, Mich.

[21] Appl. No.: 217,716

[22] Filed: Dec. 18, 1980

[51] Int. Cl.³ .................................................. B60T 13/00
[52] U.S. Cl. .................................... 60/547 B; 60/548; 91/391 R
[58] Field of Search ................. 60/547 B, 547 R, 548; 251/321, 337; 91/391 R

[56] References Cited

U.S. PATENT DOCUMENTS

| | | | |
|---|---|---|---|
| 3,352,125 | 11/1967 | Beatenbough | 251/321 |
| 3,633,363 | 1/1972 | Larsen | 60/547 B |
| 3,638,427 | 2/1972 | Meyers | 60/547 B |
| 3,728,942 | 4/1973 | Brown | 91/469 |
| 4,212,166 | 7/1980 | Tang | 60/547 R |
| 4,241,583 | 12/1980 | Farr | 60/555 |
| 4,241,753 | 12/1980 | Erwin | 251/337 |

Primary Examiner—Abraham Hershkovitz

Attorney, Agent, or Firm—Paul David Schoenle; Ken C. Decker

[57] ABSTRACT

A hydraulic brake booster (10) includes a spring-balanced control valve (42) communicating pressurized fluid to a pressure chamber (14) in response to an operator input. The magnitude of the fluid pressure communicated to the pressure chamber (14) is a function of the balance of spring forces applied to the control valve (42) by a pair of opposed springs (50, 82). An adjustable assembly (92) engages one of the opposed springs (50, 82) so that the balance of spring forces applied to the control valve (42) may be adjusted to limit to a safe level the maximum fluid pressure communicable to the pressure chamber (14). The adjustable assembly (92) includes a pair of relatively-rotatable members (106, 108) which each define oblique cam surfaces (122, 124) engaging the other member. One of the members (106) engages one of the opposed springs (50, 82). The other member (108) includes an elongate stem (118) terminating in an end (120) external of the booster housing (12).

1 Claim, 4 Drawing Figures

HYDRAULIC BRAKE BOOSTER

This invention relates to a hydraulic brake booster. More specifically, the invention relates to a hydraulic brake booster having a movable control valve for communicating pressurized fluid from a source to a pressure chamber. The pressurized fluid in the pressure chamber moves an actuator piston to operate a master cylinder. In order to control the movement of the control valve, the hydraulic brake booster includes a pair of opposed springs, one of which is moved by an input assembly in response to an operator input. The opposed springs, in balance, control the position of the control valve and, therefore, the magnitude of the fluid pressure communicated to the pressure chamber in response to an operator input. The hydraulic brake booster includes an adjustable assembly acting on the one of the pair of opposed springs biasing the control valve to a closed position. The adjustable assembly allows the bias of the one spring to be adjusted so that the magnitude of fluid pressure communicated to the pressure chamber as a function of an operator input is adjustable.

Thus, this invention relates to: A hydraulic brake booster comprising a housing defining a pressure chamber therein and a pair of bores communicating with said pressure chamber, a pressure-responsive actuator piston movably received in one of said bores and operably cooperable with a master cylinder; said housing defining an inlet, an outlet and a vent communicating with the other of said pair of bores for communicating pressurized fluid through said housing; a control valve movably received in said other bore, said control valve in a first position communicating said inlet with said outlet and communicating said pressure chamber with said vent, first resilient means received in said other bore for yieldably biasing said control valve to said first position, said housing movably receiving an input assembly engageable with said actuator piston to move said actuator piston to operate said master cylinder, said input assembly moving toward engagement with said actuator piston in response to an operator input and including structure interconnecting said input assembly with said control valve, said interconnecting structure including second resilient means for opposing said first resilient means and urging said control valve to a second position in which said control valve closes communication between said inlet and outlet and between said pressure chamber and vent and communicates pressurized fluid from said inlet to said pressure chamber in response to movement of said inlet assembly toward engagement with said actuator piston, pressurized fluid in said pressure chamber moving said actuator piston to operate said master cylinder.

A hydraulic brake booster is known in accordance with U.S. Pat. No. 3,728,942, issued Apr. 24, 1973 to A. K. Brown, Jr., in which an adjusting stud includes a projection engageable with a control valve to limit the movement of the control valve in an opening direction. Consequently, the maximum pressure communicated by the control valve to the pressure chamber of the brake booster is limited when the control valve engages the projection. The adjusting stud includes a threaded stem threadably engaging the housing of the brake booster. The stem extends to the outside of the housing so that the position of the projection relative to the housing is adjustable by rotating the stem. The maximum fluid pressure communicated to the pressure chamber is adjustable by rotating the stem. A lock nut on the stem provides for retention of a selected position of the adjusting stud.

With a hydraulic brake booster of the type illustrated in the Brown, Jr., patent, the brake booster may be calibrated during manufacture to limit to a safe level the maximum pressure communicatable to the pressure chamber. This calibration may be accomplished by installing the brake booster in a test fixture equipped with a source of pressurized fluid and a pressure gauge for indicating the fluid pressure level in the pressure chamber. An input force is applied to the input assembly of the brake booster and the adjusting stud is rotated to a position limiting the pressure level in the pressure chamber to a safe maximum level irrespective of the strength of the input force applied to the input assembly. Because the threaded stem of the adjusting stud is provided with a relatively fine-pitch thread, the stem must frequently be rotated a number of times before the stud reaches a position limiting the pressure in the pressure chamber to a safe level. Consequently, the calibration of a brake booster according to the Brown, Jr., patent is a time-consuming procedure because the stem must be rotated a number of times. Additionally after the stem is rotated to the selected position, the lock nut must be locked against the housing of the brake booster while retaining the stem in the selected position. Additional time is consumed in locking the lock nut.

The invention as claimed is intended to avoid the drawbacks of prior hydraulic brake boosters by providing a hydraulic brake booster characterized in that said brake booster includes an adjustable assembly received in said other bore and engaging said first resilient means for adjusting the bias applied by said first resilient means to said control valve, said adjustable assembly including a pair of relatively rotatable members, one of said members being axially movable in said other bore and engaging said first resilient member, the other of said members engaging said housing and being restrained from axial movement in one direction by said housing, each of said members defining an oblique cam surface transecting said other bore, said members rotatably engaging each other at said oblique cam surfaces whereby relative rotation of said members moves said one member axially in said other bore, said one member moving said first resilient means to adjust the bias provided thereby, means for relatively rotating said members and means for retaining said members in a selected relative rotational position.

The advantages offered by the invention are mainly that because of the oblique cam surfaces defined by the relatively rotatable members, only one-half turn, or less, of one of the relatively rotatable members is necessary to move the adjustable assembly through its complete adjustment range; consequently, the hydraulic brake booster can be quickly calibrated without the necessity of rotating a stem several times, as is required by the invention of Brown, Jr.

One way of carrying out the invention is described in detail below with reference to drawings which illustrate only one embodiment, in which.

Figure 1:
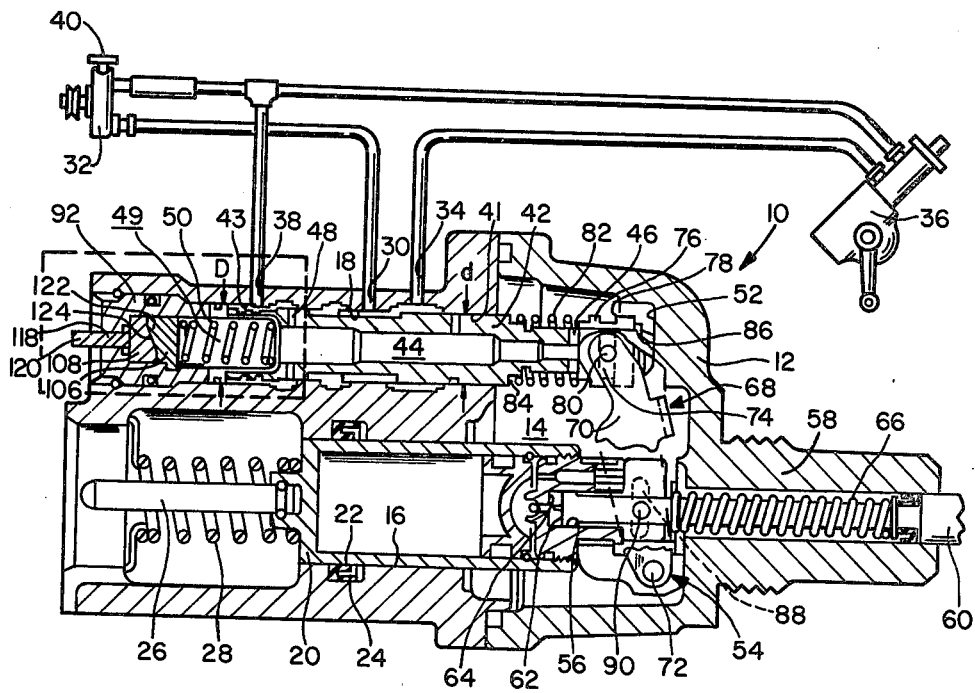
FIG. 1 is a cross-sectional view of a hydraulic brake booster.

The figures show a hydraulic brake booster 10 having a housing 12 defining a pressure chamber 14 therein. The housing 12 also defines a pair of bores 16 and 18 which communicate with the pressure chamber 14. A pressure-responsive actuator piston 20 is movably received in the bore 16. The housing 12 defines a groove 22 circumscribing the bore 16 and receiving a sealing member 24 which sealingly cooperates with the actuator piston 20. An actuating rod 26 is carried by the actuator piston 20 and is engageable with a master cylinder (not shown) to effect a brake application. A coil spring 28 biases the actuator piston 20 to a nonbraking position, as is illustrated in FIG. 1.

The housing 12 defines an inlet 30 communicating with the bore 18 and with a source of pressurized fluid, such as the power steering pump 32. An outlet 34 on the housing 12 communicates the bore 18 with a power steering gear 36. Similarly, a vent 38 communicates the bore 18 with a fluid reservoir on the power steering pump 32. The fluid reservoir is vented to atmosphere by a vented cap 40 on the reservoir of the power steering pump 32.

The bore 18 is stepped to provide a small diameter portion 41 opening to the pressure chamber 14 and a large diameter portion 43. A stepped control valve 42 is movably received in the stepped bore 18. The control valve 42 defines a number of bands and grooves which cooperate with grooves on the bore 18 to communicate pressurized fluid from the inlet 30 to the outlet 34 in the nonbraking position of the control valve, as is illustrated in FIG. 1. The control valve 42 also defines an axial passage 44 communicating with the pressure chamber 14 via a radial passage 46 and with the vent 38 via a radial passage 48 so that in the nonbraking position of the control valve the pressure chamber 14 is communicated with atmospheric pressure. The passage 44 also communicates with a chamber 49 defined in the large diameter portion 43 of the bore 18. The control valve 42 defines an effective diameter D exposed to the chamber 49 which is larger than the effective diameter d which is exposed to chamber 14.

A coil spring 50 is received in the chamber 49. The spring 50 biases the control valve 42 into engagement with an abutment 52 defined on the housing 12 to define a nonbraking position for the control valve.

An input assembly 54 is movably carried in a bore 56 on the actuator piston 20 and in a bore 58 on the housing 12. The input assembly 54 includes an input rod 60 which at its right end is operably connected to a brake pedal (not shown). At its left end the input rod 60 defines an abutment 62. The abutment 62 confronts and is engageable with an abutment 64 defined on the actuator piston 20 so that leftward movement of the input rod 60 can cause leftward movement of the actuator piston 20 to effect a brake application. A coil spring 66 is carried on the input rod 60. The coil spring 66 engages the actuator piston 20 to bias the input rod 60 and actuation piston 20 to a nonbraking relative position wherein the abutments 62 and 64 are spaced apart, as is illustrated in FIG. 1.

An interconnecting structure 68 is carried by the actuator piston 20 and by the control valve 42. The interconnecting structure 68 includes a lever 70 which is pivotally connected by a pin 72 to the actuator piston 20. The lever 70 is channel-shaped in cross section and includes a pair of legs 74 which are oriented one behind the other as viewed in FIG. 1. The legs 74 straddle a sleeve member 76 which is slidably carried on the control valve 42. The sleeve member 76 defines an annular groove 78. A pair of pins 80 (only one of which is visible in FIG. 1) extend from the legs 74 into the groove 78 so that the sleeve 76 is drivingly connected to the lever 70.

A coil spring 82 is carried on the control valve 42 and engages a shoulder 84 on the control valve and the sleeve member 76 to bias the sleeve member into engagement with a snap ring 86 carried on the control valve 42.

The lever 70 defines a slot 88 movably receiving a pin 90 which is carried by the input rod 60. Consequently, movement of the input rod 60 relative to actuator piston 20 pivots the lever 70.

Figure 2:
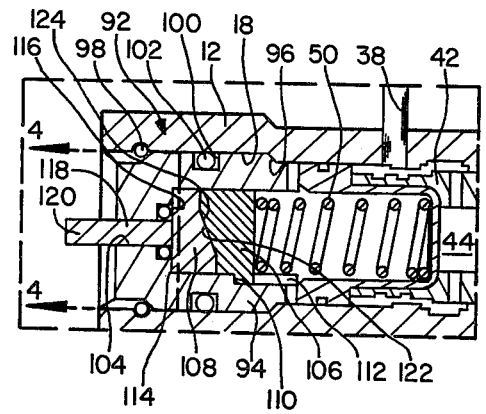
FIG. 2 is an enlarged view of an encircled portion of FIG. 1.
Figure 3:
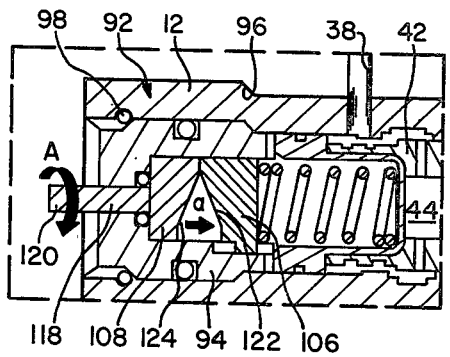
FIG. 3 is a view similar to FIG. 2.

According to the invention, an adjustable assembly 92 is received in and closes the bore 18. The adjustable assembly 92 includes a plug member 94 which is received in the bore 18. The plug member 94 is trapped in the bore 18 between a step 96 thereon and a wire-ring retainer 98. The plug member 94 defines an annular groove 100 receiving a sealing member 102. A stepped bore 104 is defined in the plug member 94 and receives a pair of relatively rotatable members 106 and 108. One of the relatively rotatable members, member 106, is axially movable in the bore 104. Member 106 is prevented from rotation by a key 110 which is integral with the member and extends radially into a keyway 112 on the bore 104. The member 106 engages the coil spring 50 so that axial movement of the member 106 changes the bias provided by the coil spring 50 to the control valve 42. The other relatively rotatable member, member 108, is rotatable in the bore 104 and defines a shoulder 114 engaging a step 116 on the bore 104. Consequently, the plug member 94 prevents leftward movement of the member 108, viewing FIG. 2. The member 108 includes an elongate stem 118 extending through the bore 104 and terminating in an end 120 external to the housing 12. Both of the relatively rotatable members 106 and 108 define oblique cam surfaces 122 and 124, respectively, which transect the bore 104. The members 106 and 108 rotatably engage each other at the oblique cam surfaces 122 and 124 so that rotation of the member 108 moves the member 106 axially in the bore 104, as is illustrated by the arrows A and a in FIG. 3.

Figure 4:
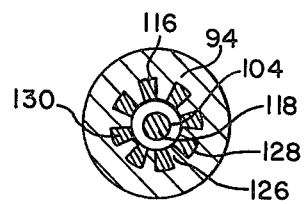
FIG. 4 is a fragmentary cross-sectional view taken along the line 4—4 of FIG. 2.

FIG. 4 illustrates that the plug member 94 defines a multitude of circumferentially spaced, radially-extending lands 126 and grooves 128 on the step 116. Similarly, the member 108 defines corresponding lands (a portion of which are illustrated at 130, viewing FIG. 4) and grooves on the shoulder 114 which interlock with the lands and grooves 126 and 128.

When a brake application is effected, the input rod 60 moves leftwardly, viewing FIG. 1, moving the abutment 62 toward engagement with the abutment 64 and pivoting the lever 70 counterclockwise. The lever 70 drives the sleeve member 76 leftwardly via the pins 80. Because the spring rate and/or preload of the coil spring 82 is greater than that of the coil spring 50, the sleeve member 76 drives the control valve 42 leftwardly, contracting the spring 50. The coil spring 82 is not significantly contracted so the radial passage 46 remains unobstructed. Leftward movement of the control valve 42 closes fluid communication from the inlet 30 to the outlet 34 and from the pressure chamber 14 to the vent 38 and opens communication from the inlet 30 to the pressure chamber 14 via passages 48, 44, and 46. Pressurized fluid communicated to the pressure chamber 14 moves the actuator piston 20 leftwardly to actuate a master cylinder via the actuating rod 26. Pressurized fluid communicated to the chamber 49 creates a rightwardly directed hydraulic force on the control valve 42 because of the difference between the effective diameters D and d defined by the control valve 42. Consequently, the position of the control valve 42, and the pressure level of pressurized fluid communicated to the pressure chamber 14 is determined by the balance of forces provided by the springs 50 and 82 and the hydraulic force. When a predetermined pressure level is reached in the pressure chamber 14 and chamber 49, the hydraulic force plus the force of spring 50 overcomes the spring 82 so that the sleeve member 76 is shifted leftwardly on the control valve 42 to close the passage 46. As a result, the pressure level in the pressure chamber 14 can not be further increased.

In light of the above, it will be appreciated that the predetermined pressure level communicable to pressure chamber 14 is adjustable because the adjustable assembly 92 allows the bias of spring 50 to be adjusted.

In order to calibrate a brake booster according to the invention, the end 120 of the stem 118 is grasped by a tool or other means and the member 108 is moved rightwardly to disengage the interlocking lands and grooves on the shoulder 114 and step 116. The member 108 is then rotatable to adjust the bias of the spring 50 to limit the pressure level communicable to the pressure chamber 14 to a predetermined level. The member 108 is moved leftwardly to interlock the lands and grooves on the shoulder 114 and step 116 so that the selected rotational position of the member 108 is retained. The spring 50 biases the member 108 leftwardly via the member 106 so that the lands and grooves remain interlocked. Because of the oblique cam surfaces 122 and 124, the member 106 is movable from its leftward position, illustrated in FIG. 2, through its entire adjustment range to its rightward position, illustrated in FIG. 3, in response to one-half turn, or less, of the member 108. As a result, calibration of a hydraulic brake booster according to the invention can be quickly accomplished.

I claim:

1. A hydraulic brake booster comprising a housing defining a pressure chamber therein and a pair of bores communicating with said pressure chamber, a pressure-responsive actuator piston movably received in one of said bores and operably cooperable with a master cylinder; said housing defining an inlet, an outlet and a vent communicating with the other of said pair of bores for communicating pressurized fluid through said housing; a control valve movably received in said other bore, said control valve in a first position communicating said inlet with said outlet and communicating said pressure chamber with said vent, first resilient means received in said other bore for yieldably biasing said control valve to said first position, said housing movably receiving an input assembly engageable with said actuator piston to move said actuator piston to operate said master cylinder, said input assembly moving toward engagement with said actuator piston in response to an operator input and including structure interconnecting said input assembly with said control valve, said interconnecting structure including second resilient means for opposing said first resilient means and urging said control valve to a second position in which said control valve closes communication between said inlet and outlet and between said pressure chamber and vent and communicates pressurized fluid from said inlet to said pressure chamber in response to movement of said inlet assembly toward engagement with said actuator piston, pressurized fluid in said pressure chamber moving said actuator piston to operate said master cylinder, characterized in that said brake booster includes an adjustable assembly received in said other bore and engaging said first resilient means for adjusting the bias applied by said first resilient means to said control valve, said adjustable assembly including a pair of relatively rotatable members and a plug with a bore receiving said members, one of said members being axially movable in said plug bore and engaging said first resilient member, the other of said members being restrained from axial movement in one direction by said plug, each of said members defining an oblique cam surface transecting said plug bore, said members rotatably engaging each other at said oblique cam surfaces whereby relative rotation of said members moves said one member axially in said plug bore, said one member moving said first resilient means to adjust the bias provided thereby, means for relatively rotating said members and means for retaining said other member in a selected relative rotational position, said means for relatively rotating said members including an elongate stem defined by said other member, said stem extending through said plug bore and terminating in an end external to said plug and housing, said end including means for grasping said stem so that said other member may be moved axially and rotatably relative to said plug via said stem, said means for retaining said members in a selected relative rotational position including a multitude of radially-extending lands and grooves defined on said other member and interlocking with a corresponding multitude of radially-extending lands and grooves defined on said plug, said other member being axially movable to disengage said lands and grooves so as to allow rotation of said other member relative to said plug comprising an interlocking fit defined between said one member and said plug.

* * * * *